UNITED STATES PATENT OFFICE.

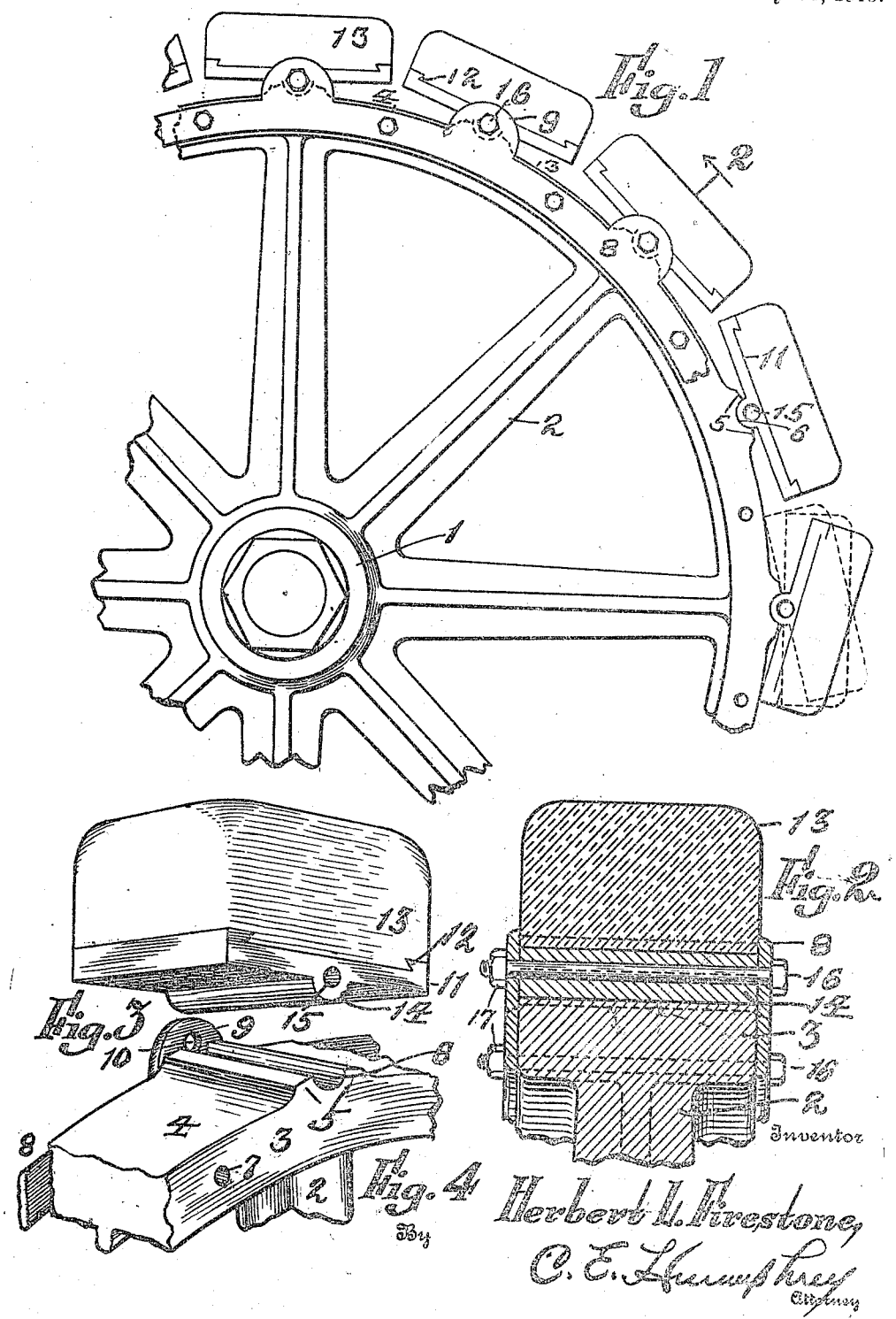

HERBERT L. FIRESTONE, OF AKRON, OHIO.

VEHICLE-WHEEL.

1,310,746. Specification of Letters Patent. Patented July 22, 1919.

Application filed September 13, 1917. Serial No. 191,179.

*To all whom it may concern:*

Be it known that I, HERBERT L. FIRESTONE, a citizen of the United States, residing at Akron, in the county of Summit and State of Ohio, have invented new and useful Improvements in Vehicle-Wheels, of which the following is a specification.

This invention has relation to improvements in the road engaging portions of vehicle wheels. The object of the invention is to provide a vehicle wheel especially adapted for use in connection with heavy vehicles such as trucks which are principally used for the transportation of merchandise. The construction of the road engaging portions of the wheel being designed to increase the tractive properties of the wheel and also to decrease the skidding of the same, by providing a tire therefor adaptable to various road conditions said tire simultaneously constituting a cushioning medium for the vehicle. The invention contemplates a wheel provided with a plurality of shoes arranged around the periphery of the wheel, each shoe mounted for rocking movement, to cause them to more easily engage the roadway and adapt themselves to the varying irregularities and inequalities thereof. Each of said shoes is provided with a tread forming block of resilient cushion material such as vulcanized rubber. By this arrangement each and every individual block may, if necessary, be removed and a new one substituted at any time without interfering with the other blocks.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a side elevation of a segment of a vehicle wheel embodying the present invention.

Fig. 2 is a radial sectional view taken approximately on line 2 of Fig. 1.

Fig. 3 is a perspective view of a shoe employed in connection with the wheel, and Fig. 4 is a perspective view of a fragment of the felly of a wheel embodying the present invention.

The wheel forming the subject matter of the present invention comprises the usual hub 1 from which radiate spokes 2 to an annular felly 3. The hub, spokes and rim are preferably integral and are usually although not necessarily formed of metal. The outer periphery 4 of the felly 3 is provided at regularly recurring intervals with a series of outwardly-projecting transversely-extending pairs of lugs 5 between the members of each pair of which is a transverse groove 6 approximately semicircular in cross section. The outer faces of the members of each pair of lugs 5 are inclined away from each other for a purpose to be later described. The felly 3 is furthermore provided with a series of transversely-extending openings 7 spaced apart and preferably alternating in position with respect to the groove 6. Secured to the lateral faces of the felly 3 are bands 8 the outer general external diameter of which is slightly less than the external diameter of the felly 3. The bands 8 are similar and hence a description of one is believed to be sufficient for the understanding of both. Each band is provided with a series of outwardly-extending lugs 9 the outer contour of each of which is approximately semicircular and each of which is provided with an opening 10. These lugs 9 are so disposed on the band 8 that the axes of the openings 10 are approximately coincident with the axes of the grooves 6.

The road engaging portions of the wheel comprise a plurality of shoes and as they are all similar a description of one is believed to be sufficient. Each shoe comprises a plate 11 provided with some resilient block holding means such as inturned or dovetailed grooves 12 and mounted on and secured to the outer face of each shoe is a block 13 of resilient material preferably having rounded corners and secured by any means to the shoe 11. The shoe 11 is provided with a transversely-extending inwardly-extending rib 14 the contour of which is such as to permit it to seat in the groove 6 of the felly 3, and is furthermore provided with an opening 15, which, when the rib 14 is seated in the groove 6, will register with the opposing openings 10 in the bands 8. Each block is then pivoted on a transversely-extending bolt 16 passed through the two openings 10 and the opening 15 of each shoe, said bolts being held in place by nuts 17. The various positions of the block carrying shoe are shown in dotted lines in Fig. 1. Each block is free to rock or oscillate on its pivotal bolt 16 so as to conform to the irregularities of the road and afford a wide bearing surface for the wheel to increase the tractive properties thereof and also to prevent skidding. If it is necessary at any time to renew a block from wear or other causes each individual block is removed by withdrawing the pivotal bolt 16 and a new block substituted therefor.

By making the outer portions of the transverse lugs 5 at an inclination to each other a greater opportunity is provided for permitting the rocking of the shoes on their pivotal bolts 16 which otherwise might be interrupted by the lugs if the latter were not so inclined.

I claim,

A vehicle wheel embodying a felly having a cylindrical outer face which is provided with a series of pairs of separate transversely-extending outwardly-projecting ribs with a space between each pair of ribs approximately semi-cylindrically formed, the spaces between pair of ribs constituting seats, a plurality of resilient block carrying shoes disposed on said felly, each of said blocks embodying an inwardly and transversely extending semi-cylindrical rib provided with an opening and arranged to be positioned in one of the seats formed between each pair of ribs on the outer face of said felly, a circumferential ring secured to each face of said felly and provided with outwardly-extending ears, each of said ears provided with an aperture constituting a bearing, said rings so disposed on said felly that the apertures in said ears are in transverse alinement with each other and also in transverse alinement with the axes of the semi-cylindrical grooves formed in said felly and bolts extending through the apertures in said ears and the apertures in the ribs on the inner faces of said block carrying shoes to provide means for permitting said block carrying shoes to tilt radially with respect to the axis of said wheel.

In testimony whereof I have hereunto set my hand.

HERBERT L. FIRESTONE.